United States Patent [19]

Abbott

[11] 4,290,320

[45] Sep. 22, 1981

[54] CONTINUOUSLY VARIABLE TRANSMISSION MECHANISMS

[75] Inventor: Randle L. Abbott, Tamworth, England

[73] Assignee: P.I.V. Antrieb Werner Reimers Kommanditgesellschaft, Bad Homburg, Fed. Rep. of Germany

[21] Appl. No.: 5,978

[22] Filed: Jan. 24, 1979

[30] Foreign Application Priority Data

Jan. 21, 1978 [GB] United Kingdom ............... 02523/78

[51] Int. Cl.³ .......................... F16H 37/00; F16H 3/44
[52] U.S. Cl. .................................... 74/689; 74/750 R
[58] Field of Search .............................. 74/689, 750 R

[56] References Cited

U.S. PATENT DOCUMENTS

| | | | |
|---|---|---|---|
| 2,745,297 | 5/1956 | Andrus | 74/689 |
| 3,251,243 | 5/1966 | Kress | 74/689 |
| 3,340,749 | 9/1967 | Magg et al. | 74/689 |
| 3,503,279 | 3/1970 | Sievert et al. | 74/689 |
| 3,943,780 | 3/1976 | Klaue | 74/750 R |

FOREIGN PATENT DOCUMENTS 428973 10/1974 U.S.S.R. ............................ 74/750 R

*Primary Examiner*—James Kee Chi
*Attorney, Agent, or Firm*—Merriam, Marshall & Bicknell

[57] ABSTRACT

The invention is concerned with a continuously variable transmission mechanism which incorporates a variator and an epicyclic gearset. Several brakes and/or clutches are arranged for selectively coupling together or holding stationary various parts of the mechanism to provide forward and reverse transmission ranges within which the overall transmission ratio can be varied by the variator. In a first mode of operation the drive is through the variator, the epicyclic gearset acting as a reduction gearing and a further reduction gearing to an output co-axial with the input. In a second mode, the gearset is locked up to provide direct drive from the variator output to the reduction drive. The ratio of the reduction drive corresponds to the maximum step-up ratio of the variator so that in the second mode, with maximum variator step up ratio the overall transmission ratio is 1:1 in a third mode the input is coupled directly to the output to bypass the variator and provide direct drive. The epicyclic gearset can be used in a reverse mode to provide a reverse gear.

6 Claims, 2 Drawing Figures

CONTINUOUSLY VARIABLE TRANSMISSION MECHANISMS

BACKGROUND OF THE INVENTION

1. FIELD OF THE INVENTION

The invention relates to continuously variable transmission mechanisms which are of the kind comprising a variator with input and output sheaves of variable diameters and a flexible band connecting the sheaves together, an epicyclic gearset incorporated in the mechanism, and clutches and/or brakes arranged for selectively coupling together or selectively holding stationary various parts of the mechanism to provide forward and reverse transmission ranges within which the overall transmission ratio can be varied by the variator.

2. DESCRIPTION OF THE PRIOR ART

Transmission mechanisms of this kind are known, for example from U.K. Patent Specification No. 1,128,694. Particularly when such a transmission mechanism is to be used in a commercial vechicle, it is desirable to provide a wide spread of gear ratios between the lowest (highest reduction) ratio and the highest ratio of the transmission. In contrast to this, in the interests of high efficiency and low stresses on the variator, it is desirble to limit the range of variator transmission ratios to a much lower range than is required by the vehicle. The provision of an epicyclic gearset such as is provided in the known transmission mechanism, can be used to enable the transmission mechanism to operate in various modes, thus extending the range of ratios of the overall transmission beyond that of the variator itself to provide a suitable range of overall transmission ratios. It is also desirable in the interests of efficiency that the variator should not have to operate for long periods of time with a high step-up or reduction ratio, particularly when a large amount of power is being transmitted. The known transmission referred to above circulates power within the transmission resulting in a large power transmission through the variator. Also, if used in a road vehicle, the known transmission mechanism would operate with a high step-up sheave ratio and a large power throughput when the vehicle travels at high speed.

SUMMARY OF THE INVENTION

An object of the invention is to provide a high efficiency transmission which can operate with a wider range of ratios than the ratio of the variator.

According to the invention a continuously variable transmission mechanism of the kind comprising a variator having input and output sheaves of variable diameters and a flexible band connecting the sheaves together, an epicyclic gearset incorporated in the mechanism and clutches and/or brakes arranged for selectively coupling together or selectively holding stationary various parts of the mechanism to provide forward and reverse transmission ranges is characterized by a configuration of the transmission such that the variator input sheave at the input to the transmission is co-axial with the transmission output shaft and can be clutched to this output shaft, that the epicyclic gearset is driven by the variator output sheave, the output from the epicyclic gearset is connected to the transmission output shaft through a reduction drive and clutches and/or brakes control the epicyclic gearset to selectively provide a reduction forward drive, a direct drive with the gearset locked up or a reverse drive. With this mechanism, when the input sheave is clutched to the output shaft, a direct drive is established with no power transmission through the variator. This enables high efficiency to be achieved during cruising conditions. When the variator is in use by establishing a drive from the variator output sheave through the epicyclic gearset, a high range of ratios is available when the gearset is locked up and a low range of ratios is available when the gearset is providing a reduction forward drive. The existence of these two ranges provides a wide overall transmission ratio range without having to employ extremes of variator ratio. The variator can be used between a maximum step-up ratio and a corresponding reduction ratio to improve the spread of available ratios.

Preferably the epicyclic gearset is co-axial with the output sheave. The overall shape and size of the transmission then corresponds generally to a conventional lay-shaft transmission with the co-axial input and output shafts as in a lay-shaft transmission and with the epicyclic gearset and the variator output sheave corresponding to the position of the cluster of lay-shaft gears. Such an arrangement enables the transmission to be installed in a conventional vehicle in place of a conventional lay-shaft transmission.

Preferably the reduction drive from the epicyclic gearset to the output shaft has a reduction ratio which is the inverse of the maximum usable variator step-up ratio. By this means, the highest overall ratio available through the variator corresponds to the direct drive ratio so that a synchronous change can be established between the drive through the variator and the direct drive from the variator input sheave to the output.

Preferably the transmission is provided with a fluid coupling on the input side of the variator input sheave. This obviates the requirement for a manually operable friction clutch and also facilitates a smooth change from one mode of operation of the transmission to another without jerks and without overloading the clutches and brakes.

The epicyclic gearset may be in the form of a simple gearset with sun gear, planet gears on a planet carrier and an annulus, with the output sheave driving the sun gear; the planet carrier can be clutched to the output of the epicyclic gearset and the annulus braked to rest to provide a reduction drive; the carrier can be braked to rest and the annulus clutched to the output of the gearset to provide reverse and the carrier and annulus can be clutched to the output of the epicyclic gearset to lock up the gearset and provide direct drive through the gearset. In this way a simple gearset provides all the required functions.

Alternatively, the epicyclic gearset may have two sun gears coupled together, each with its own planet carrier, planets and annulus with the first annulus permanently connected to the second carrier and forming the output of the epicyclic gearset; the second annulus is then clutched to the variator output sheave and the first carrier is braked to rest to provide a reduction drive; the two sun gears are clutched to the variator output and the first carrier is braked to provide reverse drive and the sun gear and second annulus are clutched to the variator output to lock up the transmission and provide direct drive. This arrangement provides the required ratios with only two clutches and one brake.

BRIEF DESCRIPTION OF THE DRAWINGS

Embodiments of the invention will now be described by way of example only with reference to the accompanying diagrammatic drawings in which.

DESCRIPTION OF THE PREFERRED EMBODIMENTS

Figure 1:
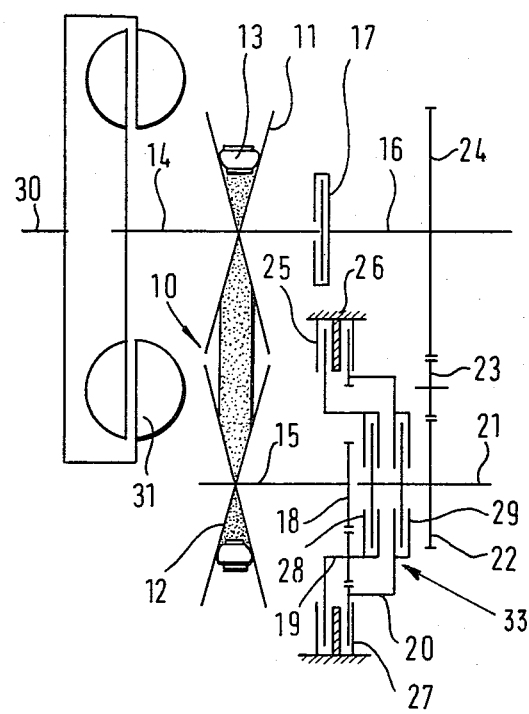
FIG. 1 is a diagrammatic representation of a first embodiment.

A variator 10 of the transmission mechanism shown in FIG. 1 has an input sheave 11, and output sheave 12 and a flexible drive band 13 interconnecting the two sheaves. The drive band is frictionally engaged with the conventional conical sheave surfaces and provides a driving connection between the two sheaves. The band may be in the form of a belt or of a chain with transverse pins for frictional engagement with the sheaves. The effective diameters of the sheaves are variable in a conventional way to vary the drive ratio of the variator. The input sheave 11 is mounted on and driven by an input shaft 14 and the output sheave 12 is mounted on and drives a variator output shaft 15.

An output shaft 16 of the transmission mechanism as a whole is co-axial with the input shaft 14 and can be selectively connected to the input shaft 14 by means of a direct drive clutch 17.

An epicyclic gearset 33 is arranged to be co-axial with the variator output sheave 12 and has its sun gear 18 permanently connected to and driven by the variator output shaft 15. The epicyclic gearset also incorporates a planet carrier 19 carrying the usual planet gears which mesh with the sun gear 18 and an annulus gear 20 which also meshes with the planet gears. Further details of the epicyclic gearset and its operation will be described subsequently.

An output shaft 21 from the epicyclic gearset 33 carries a gear 22 which meshes with an idler gear 23 which in turn meshes with a gear 24 on the output shaft 16. The gearing 22, 23, 24 is a reduction gearing between the epicyclic gearset output shaft 21 and the output shaft 16. The reduction ratio of this gearing is the same as the highest usable step-up ratio of the variator 10 for reasons which will be described subsequently.

Returning to the epicyclic gearset 33, a first brake 25 is operable to brake the planet carrier 19 to the transmission casing 26. A second brake 27 is operable to brake the annulus 20 to the casing 26. A clutch 28 is operable to clutch the planet carrier 19 to shaft 21 and a clutch 29 is operable to clutch the annulus 20 to the shaft 21.

The input shaft 14 is driven from, for example, a prime mover output shaft 30 through a fluid coupling 31.

The transmission mechanism shown in FIG. 1 can be operated in a variety of different modes which will now be described. Firstly, the mode of operation which gives the highest reduction ratio of the transmission mechanism as a whole is achieved when the clutch 17 is disengaged, brake 27 is operated to hold the annulus 20 stationary and the planet carrier 19 is clutched to the shaft 21. In this mode, the variator drives the shaft 15 which in turn drives sun gear 18 so that shaft 21 is driven at the planetary reduction ratio and drives the output shaft 16 through the reduction gearing 22, 23, 24. The reduction ratio achieved is the product of the epicyclic reduction ratio and the variator ratio. This can vary from a very large reduction when the variator is set to its maximum reduction ratio to a much lower reduction when the variator is set to its maximum step-up ratio.

A second mode of operation is obtained by leaving clutch 17 disengaged, clutching planet carrier 19 to the shaft 21 by clutch 28 and also clutching annulus 20 to the shaft 21 by clutch 29. Brakes 25 and 26 remain released. In this situation, the planetary gearset is locked up and provides a direct drive. In this mode of operation the overall drive ratio of the transmission mechanism is the product of the variator ratio and the reduction gearing 22, 23, 24. The ratios are selected so that the maximum reduction ratio available in this second mode of operation corresponds generally to the smallest reduction ratio (highest ratio) in the first mode of operation. A small overlap of ratios may be desirable. In this way, a continuous range of ratios is available.

In the second mode of operation, when the variator is set to its maximum step-up ratio, the overall transmission ratio is 1:1 because the maximum step-up variator ratio is equal to the reduction drive ratio of the gearing 22, 23, 24. In this situation, a synchronous change can be made to a direct drive through the clutch 17 by engaging the clutch 17 and simultaneously releasing clutches 28 and 29. This results in the third mode of operation and this mode of operation is particularly efficient because it does not involve the transmission of power through the variator or the epicyclic gearset.

To obtain reverse drive, the planet carrier 19 is held stationary by means of the brake 25 while the annulus 20 is clutched to the shaft 21 by means of clutch 29. The direct drive clutch 17 is of course disengaged.

While changing between the first and second modes of operation while the vehicle is in operation it is necessary for the transmission to remain in neutral while the variator ratio changes from one extreme to another. For this reason it is not possible to transmit drive continuously while this change is taking place. In contrast, power can be transmitted continuously during a change between the second mode and the third mode of operation.

In a typical example, the range of ratios available in the variator will be from a 2:1 reduction to a 2:1 step-up ratio (i.e., a ratio of 0.5:1). The reduction ratio of the gearing 22, 23, 24 should also be 2:1. A suitable reduction ratio in the planetary gearset is 2.5:1. With such an arrangement the maximum reduction ratio of the transmission as a whole would be $(2 \times 2.5 \times 2):1 = 10:1$. The highest available ratio is of course 1:1 giving a spread of ratios between the maximum and minimum of from 10:1 to 1:1.

With such an arrangement the highest ratio available in the first mode of operation would be $(0.5 \times 2.5 \times 2):1 = 2.5:1$ reduction. To achieve a reduction of 2.5:1 in the second mode of operation, it is necessary for the variator ratio to be changed from 0.5:1 to 1.25:1 so that the overall ratio becomes $(1.25 \times 1 \times 2):1 = 2.5:1$ reduction. As the maximum reduction ratio of the variator is 2:1 and not 1.25:1 there is some overlap between the ratios available in the first and second modes of operation and with a suitable control system this can be used to prevent hunting between the two modes of operation when the required ratio varies slightly either side of 2.5:1.

Figure 2:
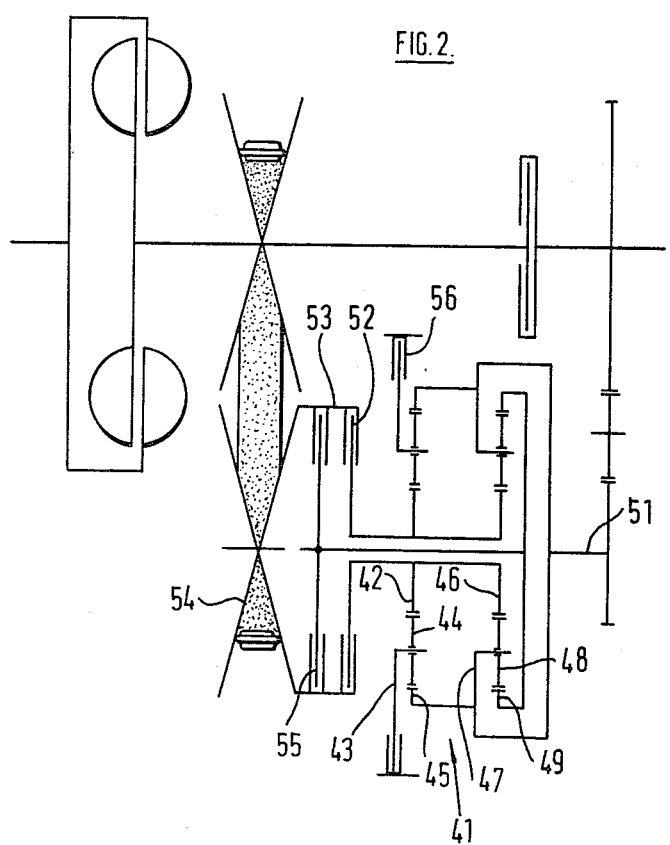
FIG. 2 is a diagrammatic representation of the second embodiment.

The arrangement shown in FIG. 2 corresponds to that of FIG. 1 with the exception of the provision of a different type of epicyclic gearset. For this reason the description of FIG. 2 will be restricted to the parts thereof which differ from FIG. 1. A compound epicyclic gearset 41 incorporates a first sun gear 42 with corresponding planet carrier 43, planet gears 44 and annulus 45 and also incorporates a second sun gear 46 with corresponding planet carrier 47, planet gears 48 and annulus 49. Annulus 45 and planet carrier 47 are permanently connected to each other and to an output shaft 51 of the planetary gearset. The two sun gears 42 and 46 are permanently connected together and are also connectable by means of a clutch 52 to a sleeve 53 which forms the output from the output sheave 54 of the variator. A second clutch 55 can connect annulus 49 to the variator output sheave. A brake 56 is provided to selectively hold the planet carrier 43 stationary. The operation of this compound planetry gearset to achieve the first and second modes of operation and reverse drive is simplified in that only two clutches and one brake and required as opposed to the requirement for two clutches and two brakes in the arrangement in FIG. 1.

To achieve a reduction drive through the epicyclic gearset 41 for the first mode of operation, clutch 55 and brake 56 are engaged. In the second mode of operation, clutches 52 and 55 are engaged to lock up the gearset while brake 56 is released. To achieve reverse drive, clutch 52 and brake 56 are engaged. The epicyclic gearset shown in FIG. 2 is of a well known type known as the Simpson type so further description of its operation is not considered necessary.

The overall operation of the transmission of FIG. 2 corresponds to that of FIG. 1, the numbers of teeth in the epicyclic gearset being selected to provide the same overall ratios as in the FIG. 1 embodiment.

I claim:

1. A continuously variable transmission mechanism comprising
   a variator having input and output sheaves of variable diameters and a flexible band connecting the sheaves together,
   an input shaft co-axial with the input sheave,
   an output shaft co-axail with the input shaft,
   clutch means for selectively connecting said input shaft to said output shaft to provide a direct drive therebetween,
   an epicyclic gearset to be driven from the output sheave and comprising elements constituted by a sun gear, a planet carrier having planet gears and an annulus,
   an output shaft from the epicyclic gearset,
   a reduction drive from the output of the epicyclic gearset to said first mentioned output shaft,
   control members for said epicyclic gearset selected from brakes and clutches for controlling the gearset to drive the output shaft thereof from the output sheave selectively in any one of a reduction forward drive, a direct drive with the gearset locked up and a reverse drive.

2. A transmission mechanism according to claim 1 wherein the epicyclic gearset is co-axial with the output sheave of the variator.

3. A transmission mechanism according to claim 1 wherein the reduction ratio of the reduction drive is the inverse of the maximum usable variator ratio.

4. A transmission mechanism according to claim 1 further comprising a fluid coupling operatively connected to the input to the transmission mechanism.

5. A transmission mechanism according to claim 1, said epicyclic gearset having a single sun gear, a single planet carrier having planet gears meshing with said sun gears and a single annulus also meshing with said planet gears,
   a permanent driving connection from the output sheave to the sun gear,
   the control members being constituted by a planet carrier brake for holding the planet carrier stationary, an annulus brake for holding the annulus stationary, a planet carrier clutch for connecting the planet carrier to the output from the gearset and an annulus clutch for connecting the annulus to the output from the gearset,
   whereby the planet carrier can be clutched to the output of the gearset and the annulus braked to rest to provide a reduction drive, the planet carrier can be braked to rest and the annulus clutched to the output of the gearset to provide reverse drive and the carrier and annulus can be clutched to the output of the epicyclic gearset to lock up the gearset and provide direct drive through the gearset.

6. A transmission mechanism according to claim 1 said epicyclic gearset comprising two sun gears coupled together, a first planet carrier, first planets and first annulus for the first sun gear and second planet carrier second planets and second annulus for the second sun gear,
   a permanent connection from the first annulus to the second carrier, said first annulus and second carrier forming the output of the epicyclic gearset,
   a sun gear clutch for selectively connecting said sun gears to the output from the variator output sheave, a second annulus clutch for selectively connecting said second annulus to the output sheave and a first carrier brake for selectively holding said first carrier stationary,
   whereby the second annulus is clutched to the variator output sheave and the first carrier is braked to rest to provide a reduction drive, the sun gears are clutched to the variator output and the first carrier is braked to provide reverse drive and the sun gear and second annulus are clutched to the variator output to lock up the transmission and provide direct drive.

* * * * *